J. SCHULDE & N. WINDBERG.
TRAP FOR REFRIGERATORS.
APPLICATION FILED JUNE 11, 1913.
1,181,961. Patented May 2, 1916.
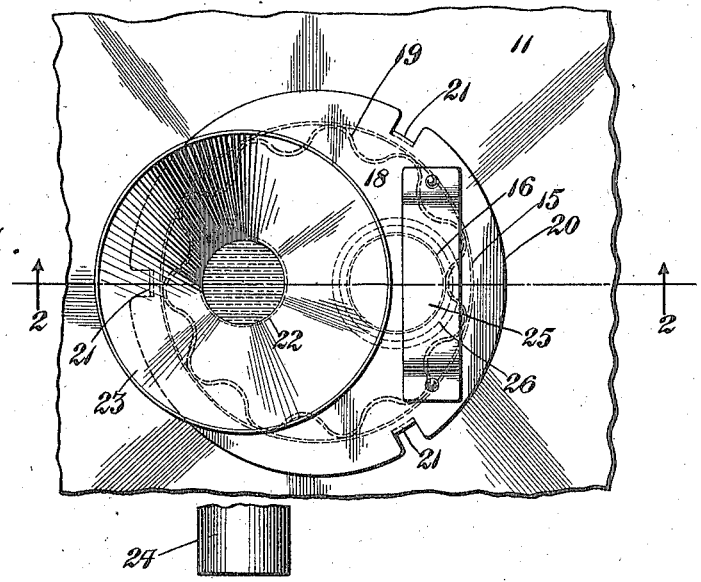
Fig. 1.
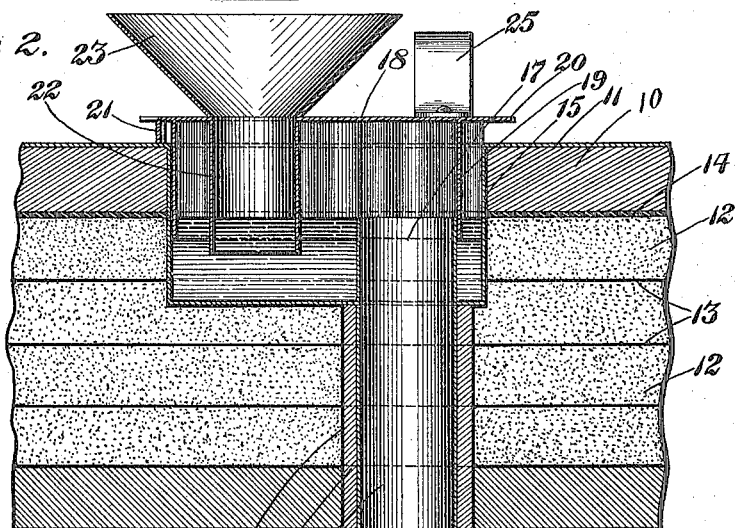
Fig. 2.
Fig. 3.
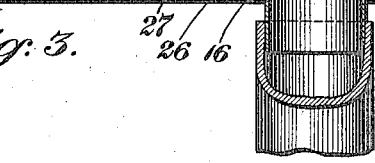
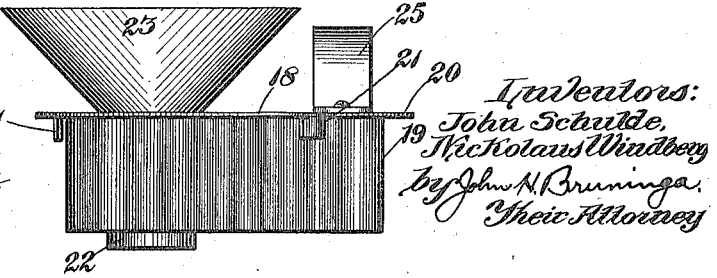
Attest:
Chas. A. Becker,
A. J. Groebl Jr.
Inventors:
John Schulde,
Nickolaus Windberg,
by John H. Bruninga,
Their Attorney

UNITED STATES PATENT OFFICE.

JOHN SCHULDE AND NICKOLAUS WINDBERG, OF ST. LOUIS, MISSOURI.

TRAP FOR REFRIGERATORS.

1,181,961.     Specification of Letters Patent.     Patented May 2, 1916.

Original application filed August 29, 1912, Serial No. 717,759. Divided and this application filed June 11, 1913. Serial No. 773,111.

*To all whom it may concern:*

Be it known that we, JOHN SCHULDE and NICKOLAUS J. WINDBERG, subjects of the Emperor of Austria-Hungary, and residing at St. Louis, in the State of Missouri, have invented certain new and useful Improvements in Traps for Refrigerators, of which the following is a specification.

This invention relates to traps for refrigerators and the like.

This application is a division of our application Serial No. 717,759, filed August 29, 1912.

The objects of this invention are to construct a trap which is simple in construction, effective in its operation, cheap to manufacture, and which is so constructed that it can be readily cleaned.

Further objects will appear from the detail description taken in connection with the accompanying drawings, in which:

Figure 1 is a plan view of the trap embodying this invention, Fig. 2 is a section on the line 2—2 Fig. 1, and Fig. 3 is a detail side elevation of one of the members forming the trap.

Referring to the accompanying drawings 10 designates the bottom wall of a refrigerator which is provided with a lining 11. The refrigerator wall is packed with layers of cork 12 separated by layers of pitch 13 and with an inside layer 14 of oiled paper. The lining 11 forms the bottom of the ice chamber as well as the bottom of the provision chamber of the refrigerator. A receptacle 15 is sunk into the bottom wall 10 so as to drain from the bottom or floor of the refrigerator. An outlet or discharge pipe 16 extends through the bottom wall and has the upper end 17 extending into and above the bottom wall of the receptacle 15. The receptacle has a cover 18 provided with a flange 19 which is corrugated vertically as shown in the drawing. The rim 20 of the cover extends over the flange and has portions thereof bent to form downwardly extending lugs 21. A drip inlet pipe 22 is mounted on and permanently secured to the cover and extends downwardly into and nearly to the bottom of the receptacle. The drip inlet pipe is formed to provide a funnel 23 receiving the drip from the drip pipe 24 connected with the drip receiver or with the ice compartment of the refrigerator. The cover is also provided with a handle 25. The outlet pipe 16 is surrounded by a sleeve 26 of wood or other non-conductor of heat coated with a layer of pitch 27.

When the cover is in position the flange 19 and the inlet pipe 22 extend downwardly into the receptacle below the upper end 17 of the outlet pipe. The rim of the cover is spaced from the floor of the refrigerator by means of the lugs 21, and the corrugations in the flange will form a series of vertical passages between the flange and the inside wall of the receptacle. The drip from the drip pipe 24 discharges into the inlet funnel 23 and from there into the receptacle. The water, etc., from the refrigerator floor will drain into the receptacle through the vertical passages formed between the flange 19 and the inside wall of the receptacle. In view of the fact that the drip inlet 22 and the flange 19 extend below the top of the upper end 17 of the outlet pipe there will be a water seal formed between the outlet pipe on one hand and between the drip inlet 22 and the refrigerator bottom on the other hand, so that air cannot enter the refrigerator. The entire trap can be cleaned by removing the cover and its attached parts, when the receptacle as well as the cover and its attached parts can be thoroughly cleaned.

The device can be made entirely of non-corrodible sheet metal and it will therefore be durable and cheap to manufacture.

It is obvious that various changes may be made in the details of construction, within the scope of the claims without departing from this invention, and it is therefore to be understood that this invention is not to be limited to the specific construction shown and described.

Having thus described the invention what is claimed is:

1. In a refrigerator, a trap comprising a receptacle set into the refrigerator bottom to drain therefrom around the edges of the receptacle, an outlet and a drip inlet to said receptacle positioned to form a seal, and means forming a seal between said outlet and the refrigerator bottom.

2. In a refrigerator, a trap comprising a receptacle draining from the refrigerator bottom, an outlet and a drip inlet to said receptacle positioned to form a seal, and a removable cover for said receptacle having means for forming a seal between said outlet and the refrigerator bottom.

3. In a refrigerator, a trap comprising a receptacle draining from the refrigerator bottom, an outlet from said receptacle, a removable cover for said receptacle having means for forming a seal between said outlet and the refrigerator bottom, and a drip inlet mounted on said cover and positioned to form a seal with said outlet.

4. In a refrigerator, a trap comprising a receptacle having an outlet, a cover for said receptacle, and a corrugated flange on said cover having alternate ridges and grooves on its outside face, and extending into said receptacle and forming a seal.

5. In a refrigerator, a trap comprising a receptacle having an outlet, a cover for said receptacle, means for spacing said cover from the top of said receptacle, and a flange on said cover extending into said receptacle and forming a seal.

6. In a refrigerator, a trap comprising a receptacle having an outlet, a cover for said receptacle, spacing lugs on the rim of said cover, and a flange on said cover extending into said receptacle and forming a seal.

7. In a refrigerator, a trap comprising a receptacle having an outlet, a cover for said receptacle, a corrugated flange on said cover extending into said receptacle and forming a seal, and lugs on the rim of said cover for supporting said cover in spaced relation with respect to said receptacle.

In testimony whereof we affix our signatures in the presence of two witnesses.

JOHN SCHULDE.
NICKOLAUS WINDBERG.

Witnesses:
J. H. BRUNINGA,
O. J. GROEBL, Jr.

Copies of this patent may be obtained for five cents each, by addressing the "Commissioner of Patents, Washington, D. C."